(12) United States Patent
Zhang et al.

(10) Patent No.: US 10,459,543 B2
(45) Date of Patent: Oct. 29, 2019

(54) INPUT DEVICE USING MAGNETIC FIELD FOR INPUT DETECTION

(71) Applicant: Microsoft Technology Licensing, LLC, Redmond, WA (US)

(72) Inventors: Chunlai Zhang, Shenzhen (CN); Kelong Zhao, Shenzhen (CN); David Michael Lane, Sammamish, WA (US); Benson Zhai, Shenzhen (CN); Ping Yang, Shenzhen (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 58 days.

(21) Appl. No.: 15/903,917

(22) Filed: Feb. 23, 2018

(65) Prior Publication Data

US 2018/0277058 A1  Sep. 27, 2018

(30) Foreign Application Priority Data

Mar. 23, 2017 (CN) .......................... 2017 1 0179061

(51) Int. Cl.
*G06F 3/0362* (2013.01)
*G06F 3/0354* (2013.01)

(52) U.S. Cl.
CPC ........ *G06F 3/0362* (2013.01); *G06F 3/03543* (2013.01)

(58) Field of Classification Search
CPC ........................... G01D 5/3473; H01H 19/001
See application file for complete search history.

(56) References Cited

U.S. PATENT DOCUMENTS

| | | |
|---|---|---|
| 4,045,738 A | 8/1977 | Buzzell |
| 4,409,548 A | 10/1983 | Focht |
| 4,677,378 A | 6/1987 | Tokura et al. |
| 4,894,613 A | 1/1990 | Tsugawa |
| 4,922,198 A | 5/1990 | Sandhagen et al. |
| 5,721,486 A | 2/1998 | Pape |
| 5,744,950 A | 4/1998 | Seefeldt |
| 6,249,118 B1 | 6/2001 | Palfenier |
| 6,580,271 B2 | 6/2003 | Li et al. |
| 6,727,689 B1 | 4/2004 | Furlong et al. |
| 7,002,310 B2 | 2/2006 | Cavarec et al. |

(Continued)

OTHER PUBLICATIONS

Teschler, Leland, "Toward the Instant-On Actuator", http://machinedesign.com/archive/toward-instant-actuator, Published on: Jul. 27, 2006, 12 pages.

*Primary Examiner* — Gene W Lee
(74) *Attorney, Agent, or Firm* — Arent Fox LLP

(57) ABSTRACT

Described are examples of an input device having a wheel with a plurality of teeth, where at least the plurality of teeth are composed of a ferrous or magnetic material. A magnet is disposed to provide a first magnetic field that attracts the ferrous or magnetic material of the plurality of teeth to provide a detent action when moving the wheel from a first position to a second position. A magnet sheet is disposed to provide a second magnetic field that causes the magnet sheet to deform based on magnetic attraction to the ferrous or magnetic material of the plurality of teeth when moving the wheel from the first position to the second position. A strain sensor coupled to the magnet sheet can detect a strain caused by deformation of the magnet sheet, and provide an electronic signal indicating the strain.

20 Claims, 8 Drawing Sheets

(56) References Cited

U.S. PATENT DOCUMENTS

| | | | |
|---|---|---|---|
| 9,103,847 B2 | 8/2015 | Pigott et al. | |
| 9,200,884 B2 | 12/2015 | Ueda et al. | |
| 9,291,479 B2 | 3/2016 | Gayney et al. | |
| 9,964,457 B2* | 5/2018 | Duff | G01L 5/221 |
| 10,082,893 B2* | 9/2018 | Yun | G06F 3/0362 |
| 2007/0188453 A1* | 8/2007 | O'Sullivan | G06F 3/0312 |
| | | | 345/163 |
| 2016/0334888 A1* | 11/2016 | Park | G06F 3/0362 |
| 2018/0166235 A1* | 6/2018 | Merminod | G06F 3/04847 |

* cited by examiner

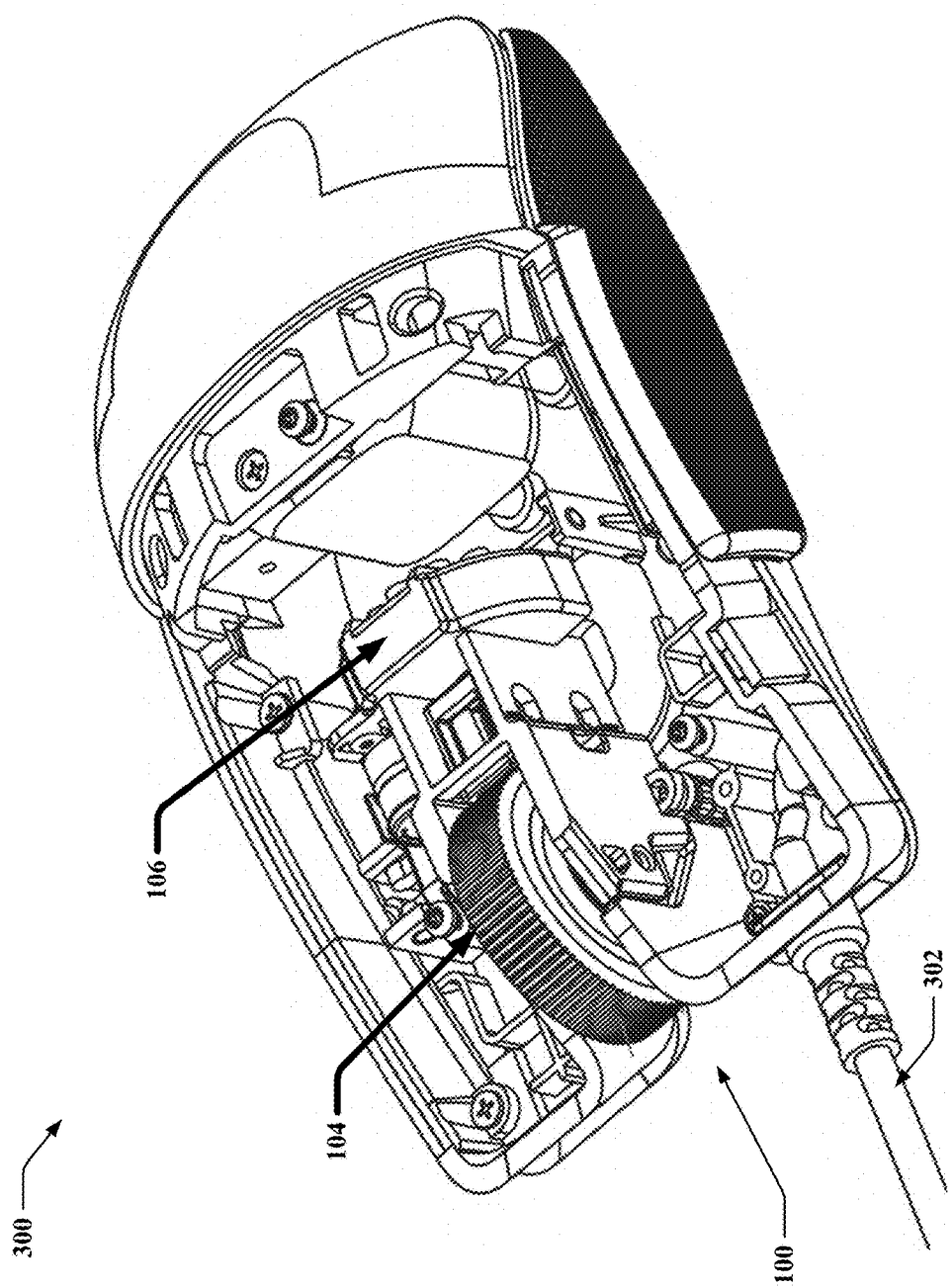

US 10,459,543 B2

INPUT DEVICE USING MAGNETIC FIELD FOR INPUT DETECTION

CLAIM OF PRIORITY UNDER 35 U.S.C. § 119

The present Application for Patent claims priority to Chinese Patent Application No. 201710179061.2 entitled "INPUT DEVICE USING MAGNETIC FIELD FOR INPUT DETECTION" filed in the State Intellectual Property Office of China on Mar. 23, 2017, which is assigned to the assignee hereof and hereby expressly incorporated by reference herein for all purposes.

BACKGROUND

Use of computing devices is becoming more ubiquitous by the day. Computing devices often employ a variety of input devices to allow a user to interact with the computing device. Some computing devices allow use of a mouse to cause movement of a cursor on a display of the computing devices. A mouse typically has one or more wheels configured to cause an input on the computing device, which is typically a scrolling action to scroll through a document or other item graphically presented on the display of the device. The wheels are typically mechanical in nature and include a ratchet hub that engages one or more spring members to provide a detent action and/or detect movement of the wheel among various ratcheted positions. Over time, these mechanical parts can breakdown, which may cause failure of the wheel as an input mechanism of the mouse.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an example, an input device is provided including a wheel having a core having a plurality of teeth disposed on an outer edge of the core with a plurality of grooves between the plurality of teeth, where at least the plurality of teeth are composed of a ferrous or magnetic material. The input device also includes a magnet disposed to provide a first magnetic field that attracts the ferrous or magnetic material of the plurality of teeth to provide a detent action when moving the wheel from a first position to a second position, and a magnet sheet disposed to provide a second magnetic field that causes the magnet sheet to deform based on magnetic attraction to the ferrous or magnetic material of the plurality of teeth when moving the wheel from the first position to the second position. The input device additionally includes a strain sensor coupled to the magnet sheet and configured to detect a strain caused by deformation of the magnet sheet, and provide an electronic signal indicating the strain.

In another example, a method for generating signals at an input device is provided. The method includes detecting, via a strain sensor, a strain that achieves a threshold, where the strain is applied by a magnet sheet deforming via magnetic attraction to one or more of a plurality of teeth of a core of a wheel moving from a first position to a second position, where the plurality of teeth are composed of a ferrous material. The method also includes generating, via a processor, an electronic signal based on the strain achieving the threshold, and transmitting, via the processor, the electronic signal to a computing device using an interface between the computing device and the input device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 3 is a partially cut-away perspective view of an example of a mouse that can employ the input device described herein.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples of an input device for a computing device that is configured with a plurality of magnets to provide perceived mechanical action for movement of the input device and/or to detect movement of the input device. For example, the input device may be an encoder including a wheel with a core having a plurality of teeth disposed on an outer edge of the core, with a plurality of grooves between the plurality of teeth, in a gear or cog like structure. The plurality of teeth, and/or the entire core, may be composed of a ferrous or magnetic material. The input device may also include a magnet disposed to provide a magnetic field that attracts the ferrous or magnetic material of the plurality of teeth, and hence that resists movement of each tooth away from the magnet, to provide a detent action (e.g., at each tooth of the core) when moving the wheel among various positions. In addition, a magnet sheet can be disposed to provide another magnetic field that causes the magnet sheet to deform in correlation with the detent action based on magnetic attraction to the ferrous or magnetic material of the plurality of teeth when moving the wheel among the various positions. A strain sensor can be coupled to the magnet sheet and configured to detect a strain (or force) caused by the deformation of the magnet sheet. The strain sensor can provide an electronic signal indicating strain. Thus, for example, there can be a one-to-one correspondence between each detent action as the wheel moves among positions and each deformation of the magnet sheet that results in sufficient strain for the strain sensor to generate the electronic signal. In an implementation, the electronic signal may be an encoder signal corresponding to movement of the wheel, where the encoder signal can be provided as an input to a computer device, such as to control scrolling through a document or other item graphically presented on the display of the device, control volume input on an audio device, etc.

Figure 4:
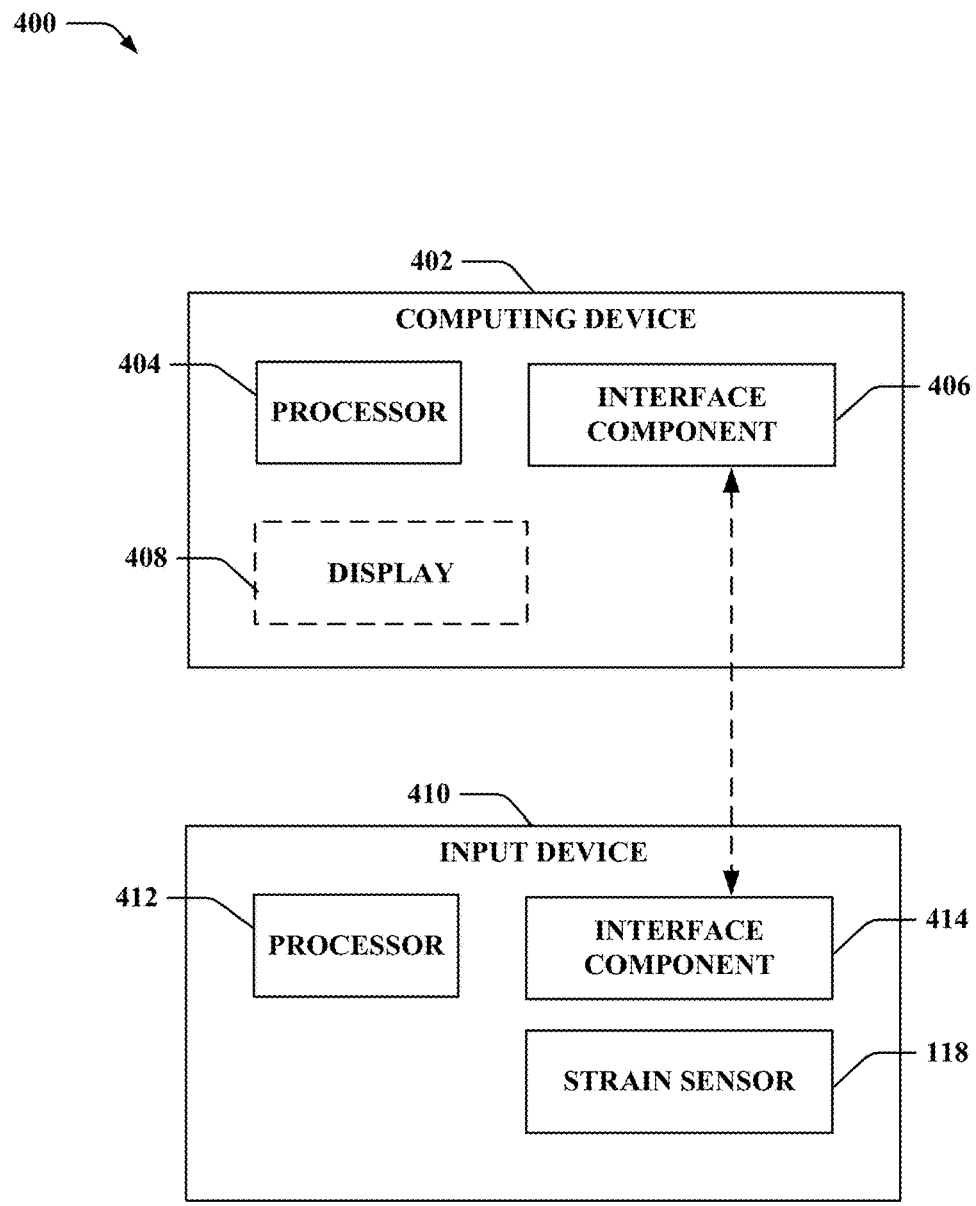
FIG. 4 is a schematic diagram of an example of a computing environment including a computing device that can receive signals from an input device.
Figure 5:
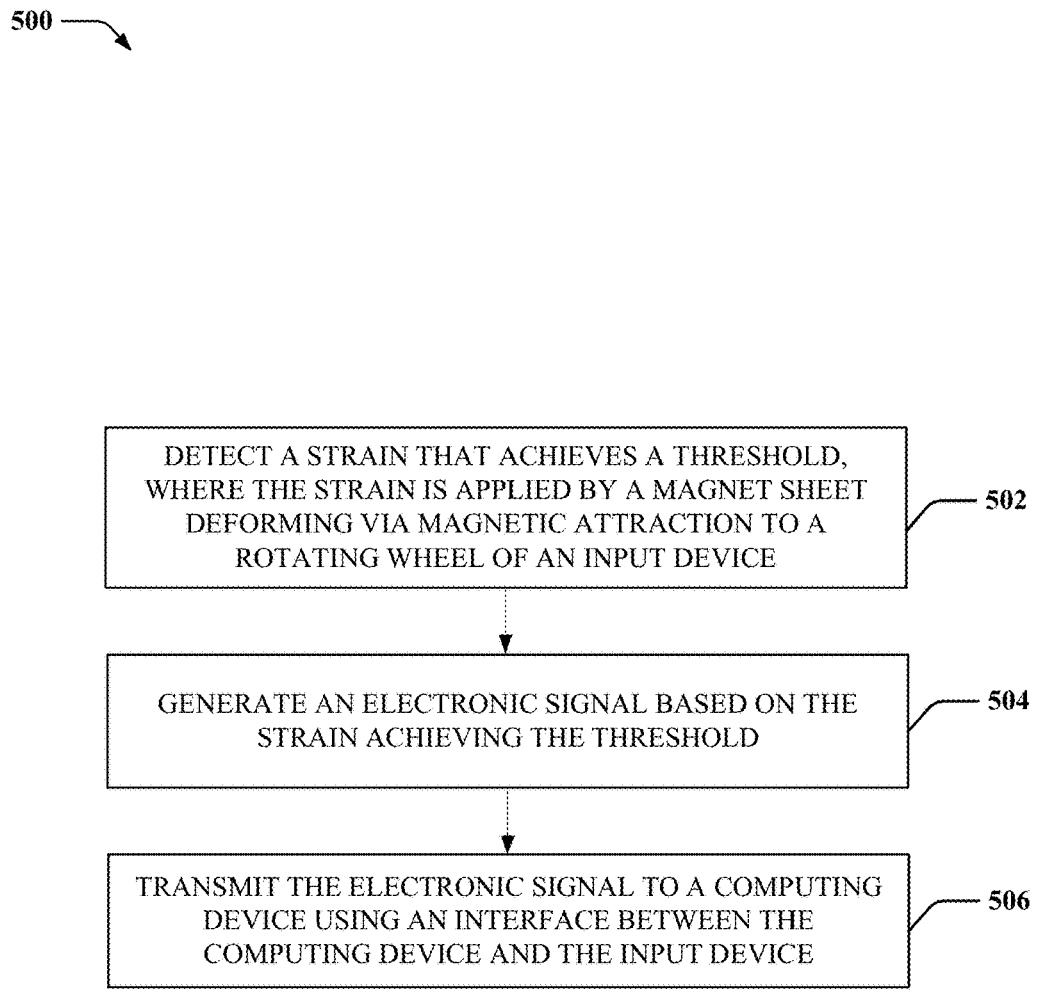
FIG. 5 is a flow diagram of an example of a method for providing signals from an input device to a computing device.

Turning now to FIGS. 1-5, examples are depicted with reference to one or more components and one or more methods that may perform the actions or operations described herein, where components and/or actions/operations in dashed line may be optional. Although the operations described below in FIG. 5 are presented in a particular order, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

Referring to FIGS. 1, 2A, 2B, and 2C, an example input device 100 can include a wheel 104 and a housing 106 to which the wheel 104 is rotatably mounted. The housing 106 may include an axle 108 to which a hub 109 of the wheel 104 can attach to facilitate rotational movement of the wheel 104 about the axle 108 in the direction 107. In an example, the wheel 104 can include a core 110 fixedly attached to the hub 109, wherein the core 110 has a plurality of teeth 111 defined by a corresponding plurality of grooves 105. For instance, the core 110 may be a gear, or may have a cog-like shape with the plurality of teeth 111 substantially equally spaced between a plurality of grooves around the core 110. In one example, at least a portion of the plurality of teeth 111 can be composed of a ferrous or magnetic material that can be attracted to a magnetic field. In another example, all of the plurality of teeth 111 and/or the entire core 110 of the wheel 104 may be composed of ferrous or magnetic material. Additionally, the wheel 104 may include a protective layer 112 disposed over the core 110. For example, the protective layer 112 may include, but is not limited to, an elastomeric material, such as silicone, or any other material to provide a more comfortable surface (e.g., to a user touching the wheel 104) than the plurality of teeth 111. In addition, the protective layer 112 may include a plurality of detents or ridges 113 to provide a texture to the surface to allow for increased grip when a user rotates the wheel 104.

Input device 100 may also include one or more magnets 114 fixedly mounted within the housing 106 in a position to generate a magnetic field that can attract one or more of the plurality of teeth 111 of the wheel 104. For instance, the one or more magnets 114 may be secured within one or more internal walls of a support frame 115, which is fixedly mounted within one or more internal walls of the housing 106. The one or more magnets 114 can be positioned within the housing 106 at a sufficient distance from, and/or situated tangentially spaced apart from, the wheel 104 to allow the plurality of teeth 111 to be attracted to the magnetic field. For example, the one or more magnets 114 may be positioned such that an end of the one or more magnets 114 with a North pole polarity faces the wheel 104 so as to magnetically attract the plurality of teeth 111. For example, the one or more magnets 114 may include a plurality of magnets stacked on top of one another with the North pole of each of the plurality of magnets facing the wheel 104. In another example, the one or more magnets 114 may include a plurality of magnets configured as a Halbach array magnet such to have a spatially rotating pattern of magnetization. For example, the one or more magnets 114 in this example can include a plurality of permanent magnets that augment the magnetic field on the end facing the wheel 104 while cancelling the field nearly to zero on the opposing end, e.g., the end not facing the wheel. The one or more magnets can be placed at a distance from the wheel 104 to provide a desired level of detent force when rotating the wheel 104.

The configuration of the plurality of magnets 114 can provide a detent action when each of the plurality of teeth 111 of the wheel 104 is rotated to be positioned adjacent to the one or more magnets 114. For example, each time one tooth of the plurality of teeth 111 passes into the magnetic field generated by the one or more magnets 114, the tooth may be attracted to the magnetic field, and may require less force to move so that the magnetic field biases the tooth to be substantially aligned with the one or more magnets 114, for example, in a plane aligned with line 117 (FIG. 2A), which is a plane in a highest strength portion of the magnetic field. Accordingly, rotating the wheel 104 to move the tooth (e.g., tooth 130) outside of the magnetic field, e.g., outside of the plane of line 117 (FIG. 2A), may require additional force. As rotation of the wheel 104 continues, the next tooth (e.g., tooth 132) may be attracted to the magnetic field, and so on, thus providing a detent action when each of the plurality of teeth 111 is rotationally aligned with the magnetic field, e.g., along line 117.

Additionally, the input device 100 may include a magnet sheet 116 that can be used in combination with a strain sensor 118 to detect presence of a tooth of the plurality of teeth 111 in a vicinity of the magnet sheet 116, based on magnetic attraction, as the wheel 104 is rotated relative to the magnet sheet 116. The magnet sheet 116 may include substantially any planar sheet of magnetic material that can be elastically deformed based on changes in a magnetic field. For example, the magnet sheet 116 may be positioned at a sufficient distance from, and/or situated in a plane tangentially spaced apart from, the wheel 104, and may be aligned to have a polarity to provide an attracting magnetic field at least at one side of the magnet sheet 116. Further, the magnet sheet 116 may have a size and thickness that allows deformation of a suspended portion (e.g., the middle area of the sheet) based on differences in a magnetic field. In an example, the magnet sheet 116 is fixedly mounted at one or more peripheral points or edges between an internal wall of the housing 106 and an end wall of the support frame 115. With this configuration, as the wheel 104 is rotated, each tooth of the plurality of teeth 111 can cause at least a portion (e.g., a portion of the suspended middle area) of the magnet sheet 116 to deform from a first state, relatively further away from the tooth, to a second deformed state, relatively closer to the tooth (e.g., toward the tooth; perpendicular to a tangent of the wheel) by magnetic attraction. The deformation of the portion of the magnet sheet 116 may be at a maximum, for example, when the longitudinal axis of the tooth is aligned with line 117. Further, the portion of the magnet sheet 116 may deform back to the first state as the tooth passes through and past the magnetic field, e.g., when the longitudinal axis of the tooth is rotated out of alignment with line 117. The deformation of the portion of the magnet sheet 116 between the first state and the second deformed state can be in the direction 119 (e.g., parallel to line 117).

Figure 1:
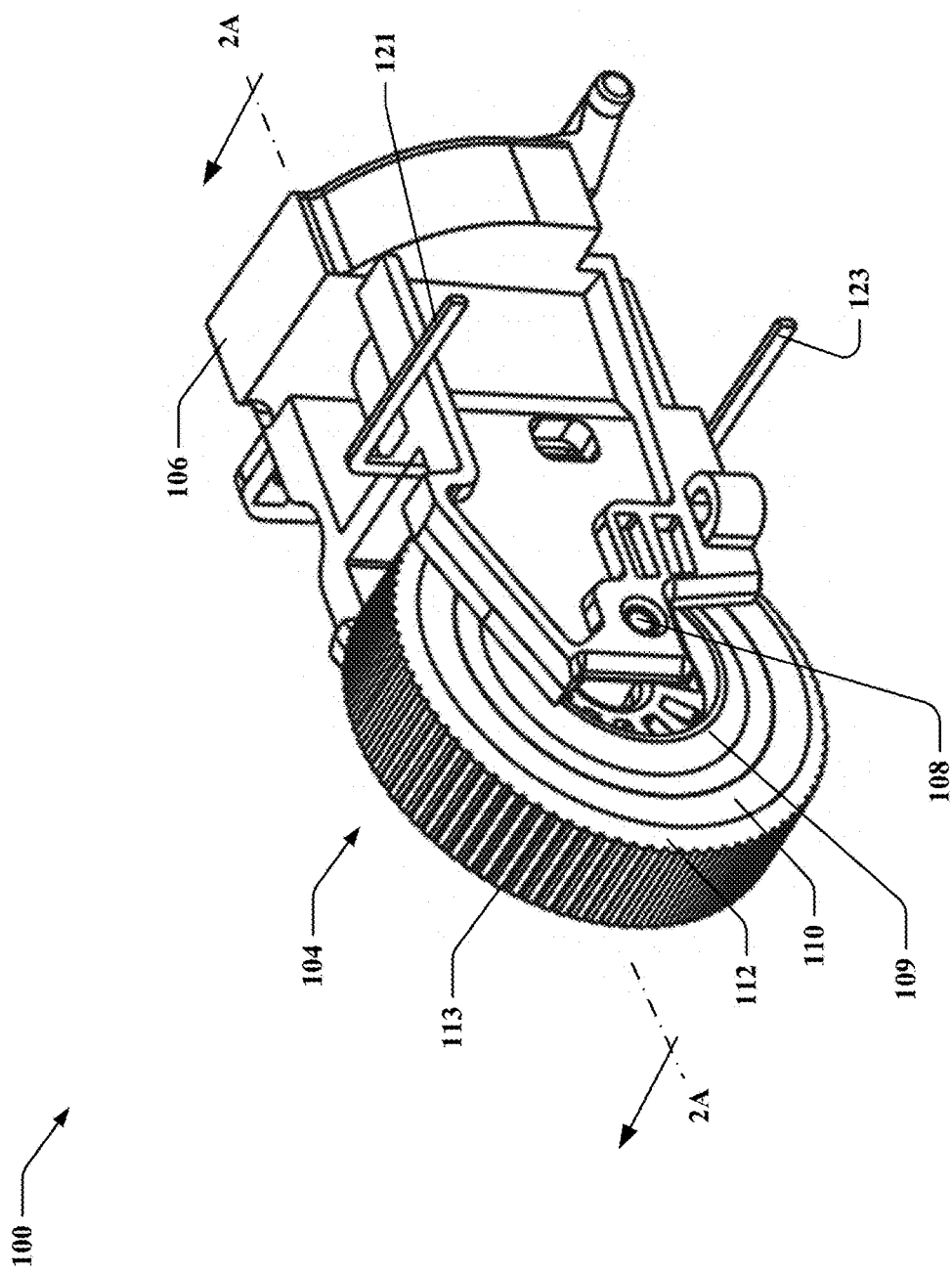
FIG. 1 is a perspective view of an example of an input device with wires for providing signals from a strain sensor.
Figure 2A:
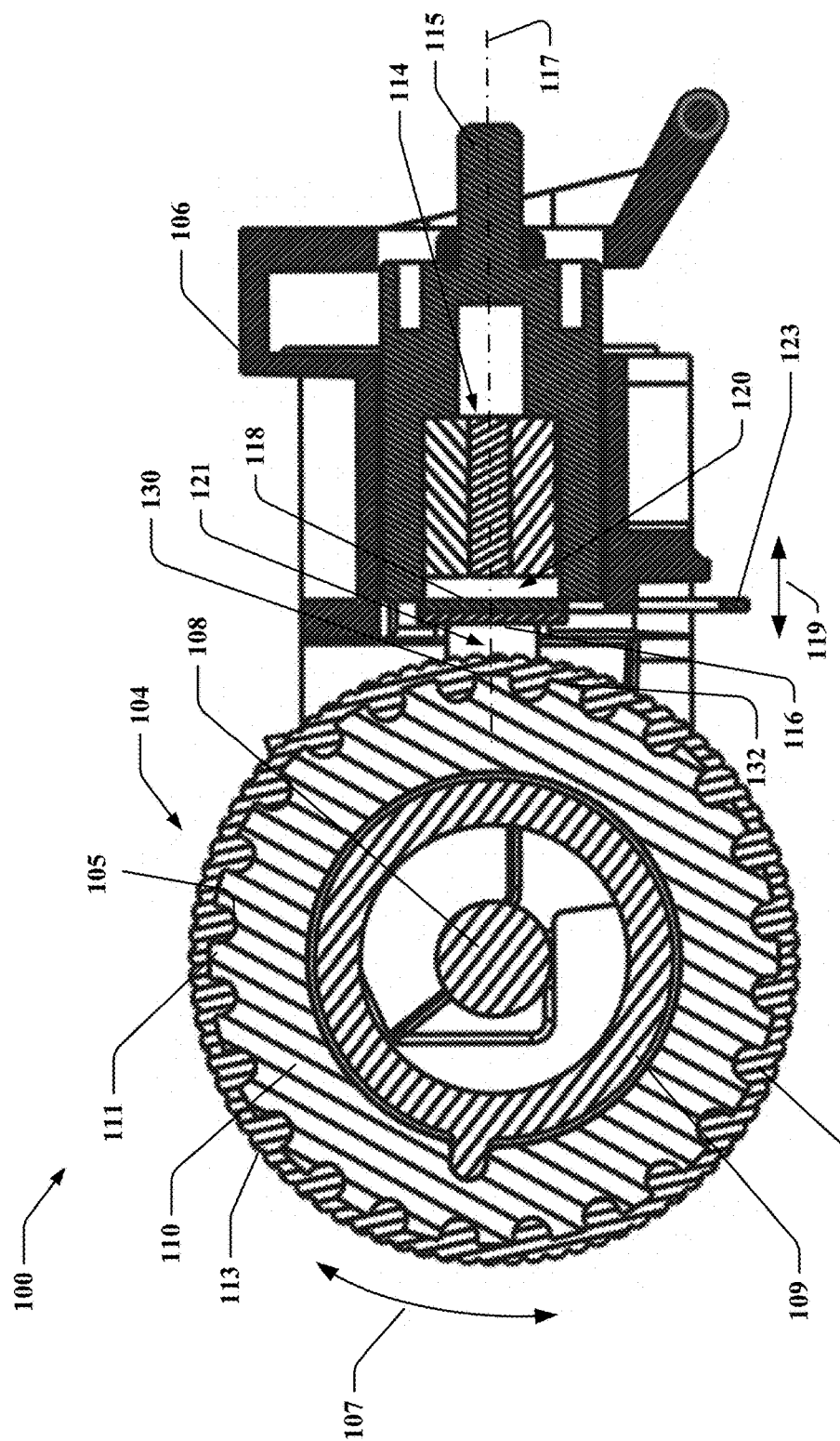
FIG. 2A is cross sectional view along line 2A-2A of the input device of FIG. 1.
Figure 2B:
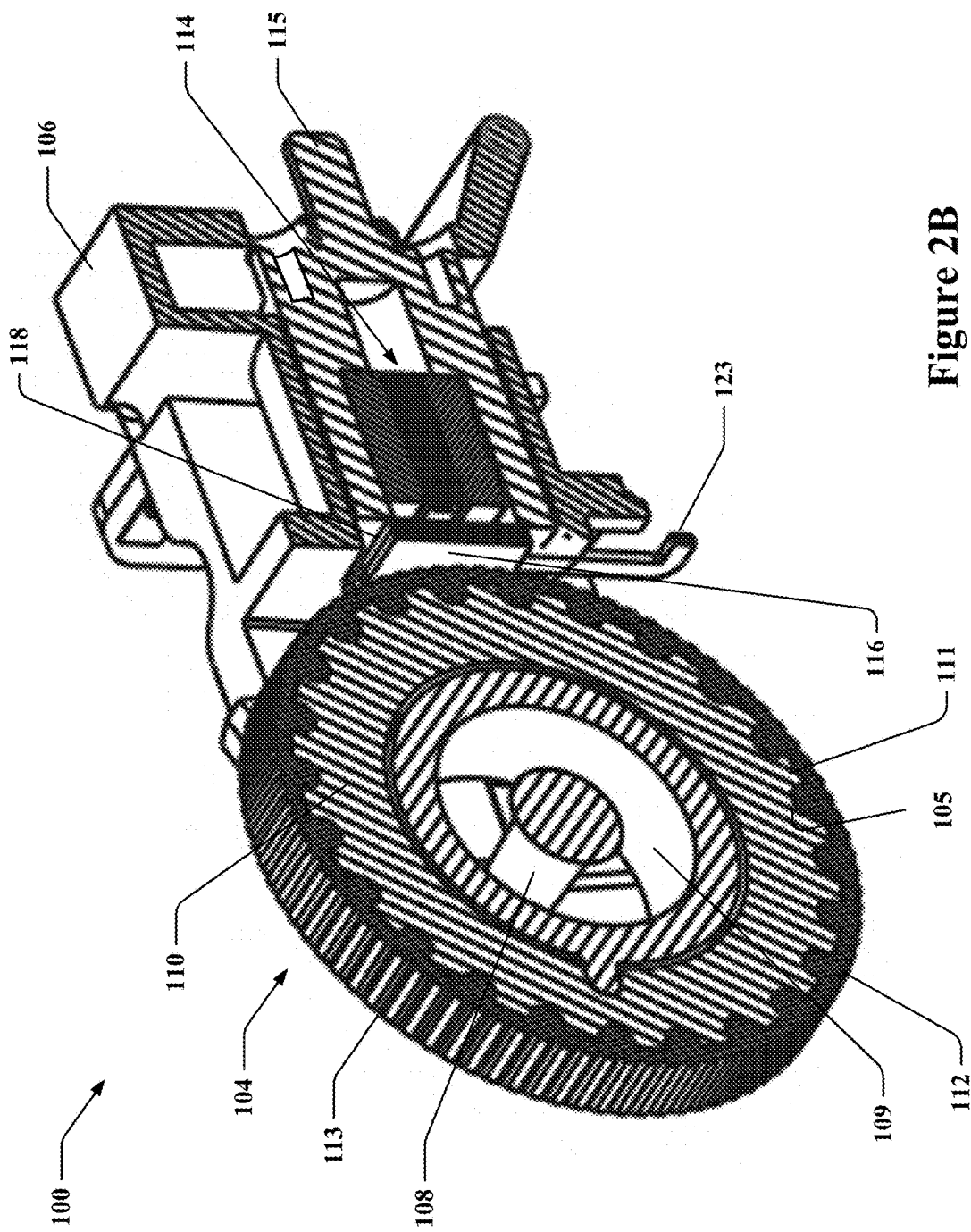
FIG. 2B is a perspective view of the cross section of the input device of FIG. 2A.
Figure 2C:
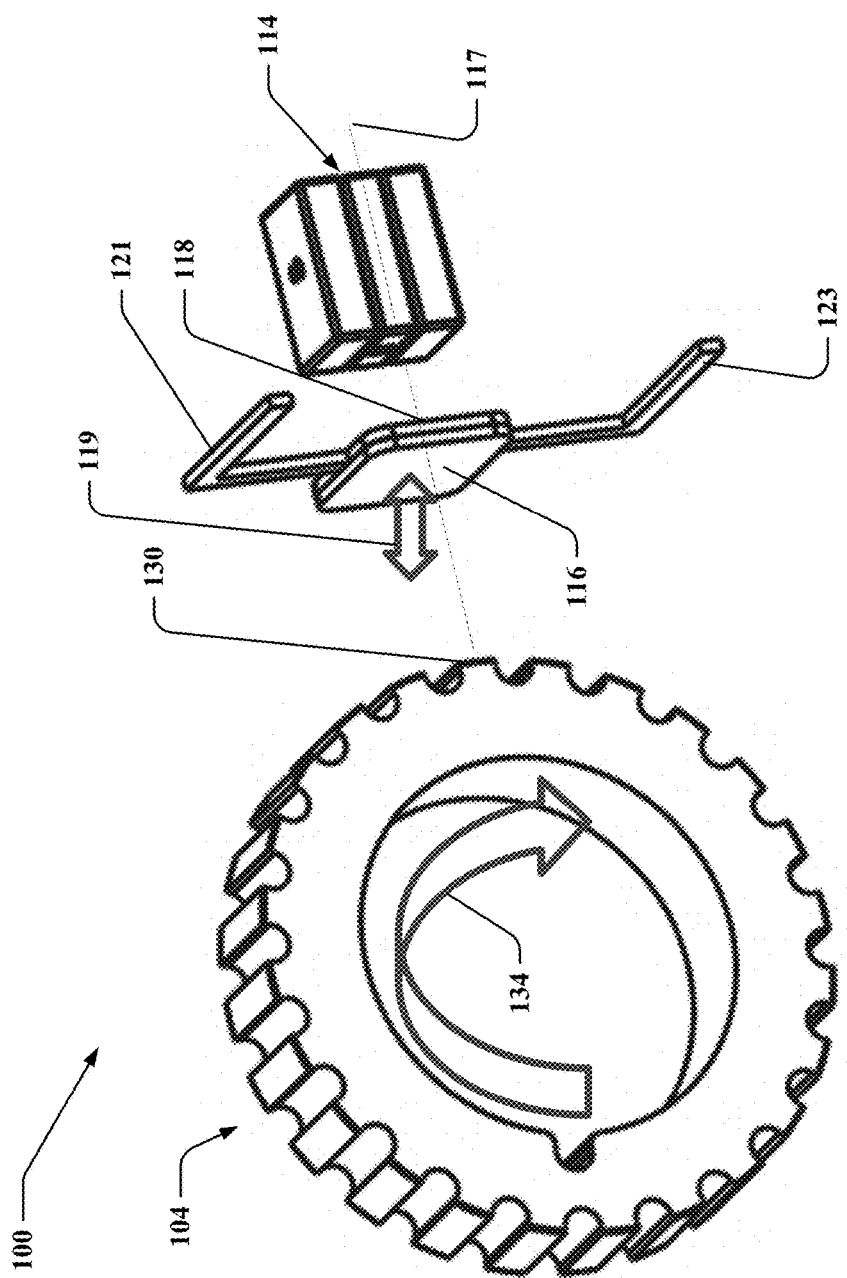
FIG. 2C is a perspective view of the cross section of a wheel and magnet structure of the input device of FIG. 2A.

As shown in FIG. 2C, the wheel 104 may rotate in a direction from the top of the magnet sheet 116 to the bottom of the magnet sheet 116. As tooth 130 passes from a first position where the tooth is above line 117 to a second position where the tooth is aligned with line 117, the magnet sheet 116 can deform from the first state starting at a point on the magnet sheet 116 that is above the line 117, and can continue to deform as the wheel 104 rotates toward the line 117. As the wheel 104 rotates toward the line 117, the point of maximum deformation of the magnet sheet 116 may change and align with the tooth 130, causing a rocking type motion as the tooth 130 aligns with the line 117 and continues to move below line 117 as the wheel is rotated in the direction of arrow 134. The strain sensor 118 can detect the deformation of the magnet sheet 116, and can accordingly generate a strain output.

The output from strain sensor 118 may indicate the area of the magnet sheet 116 having the point of maximum deformation. For example, the output from the strain sensor 118 may be a wave indicating the point of maximum deformation. Thus, the profile of the strain output (e.g., of the wave) may indicate whether the wheel 104 is rotating from the top of the magnet sheet 116 towards the bottom of the magnet sheet 116 or vice versa. For example, where the strain sensor 118 outputs a strain profile as a wave indicating strain relative to an area of the strain sensor 118 (e.g., a center portion), the wave can indicate a position of a tooth 130 relative to the area of the strain sensor 118, where a highest point in the wave can indicate the wheel 104 is aligned with the area of the strain sensor 118 (e.g., a center portion along line 117). In one example, though not shown, the wheel 104 or portion of the housing (e.g., hub 109, core 110, etc.) may include a sensor to track a direction of movement of the wheel 104 (e.g., in the direction of arrow 134 or the opposite direction), which can additionally be output from the input device 100 (e.g., along with the strain or an indication of a movement caused by detecting that the strain on strain sensor 118 achieves a threshold)

Additionally, in an example, the area of the strain sensor 118 may be an off-center portion, such that the strain profile may indicate a direction of rotation of the wheel 104 (e.g., a shorter wave (in duration) can indicate one direction of rotation (e.g., in the direction of arrow 134), and a longer wave can indicate the other direction of rotation). In yet another example, the strain sensor 118 may output the strain profile indicating strain at multiple areas of the strain sensor 118, such as at positions around the center portion of the strain sensor 118, and the wave profile can accordingly indicate a direction of rotation. Thus, in any case, for example, a direction of movement of the wheel 104 can be accordingly determined based on the strain profile, and the wheel 104 and/or housing 106 may not use a sensor to detect rotation direction, as described above.

Figure 2D:
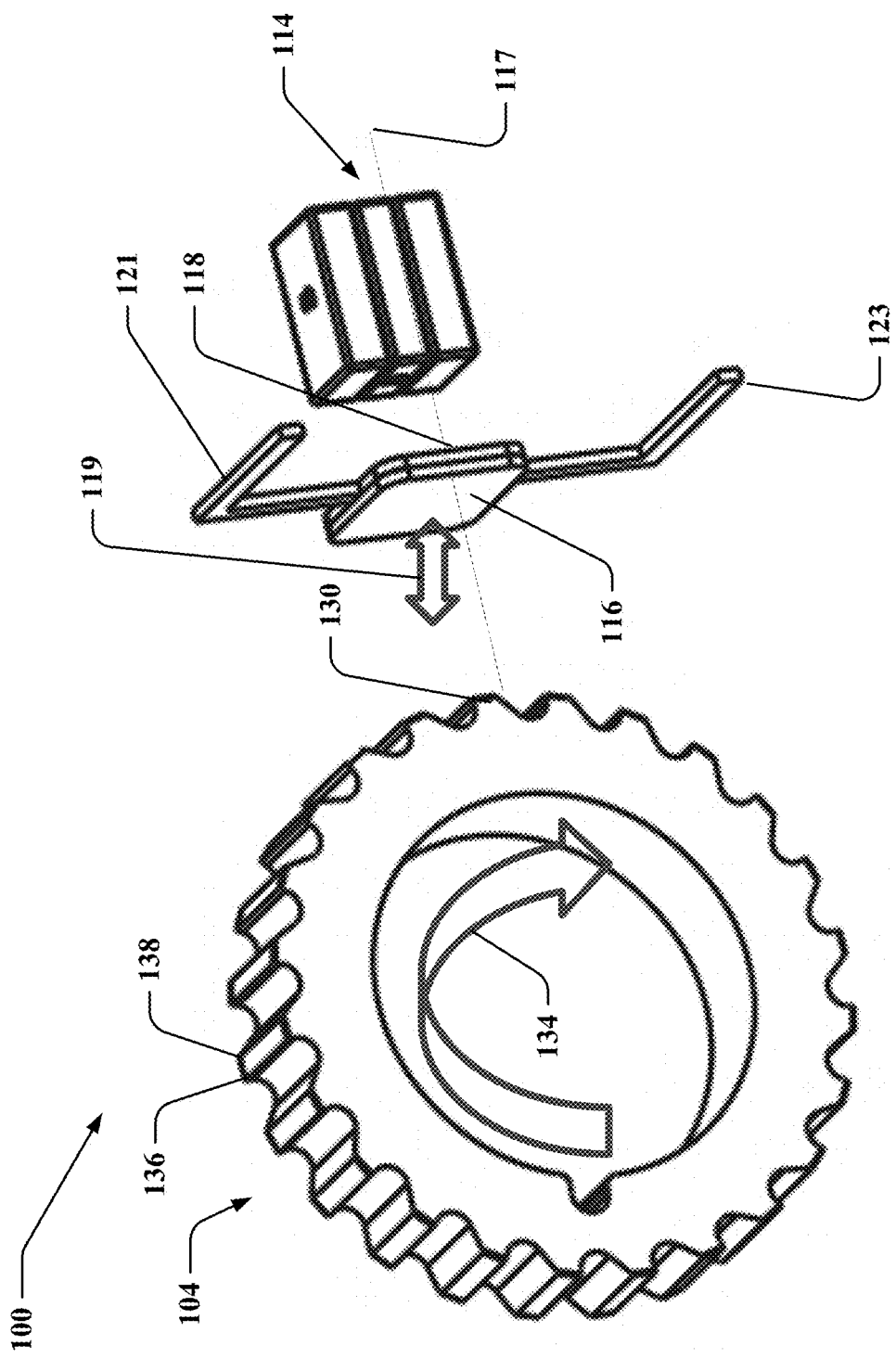
FIG. 2D is a perspective view of the cross section of another example of the wheel, having teeth with an asymmetric profile, and magnet structure of the input device of FIG. 2A.

In another example, the plurality of teeth of the wheel 104 may have an asymmetric profile, as illustrated in FIG. 2D. In this example, the strain profile output by strain sensor 118 as the wheel 104 rotates can indicate a direction of rotation. In this example, a wave with a longer onset (in duration) can indicate a direction of rotation in the direction of arrow 134, as the side 138 of the teeth has a longer curve than side 136. Similarly, for example, a wave with a shorter onset can indicate the other direction of rotation, opposite of arrow 134, as the side 136 of the teeth has a shorter curve than side 136. In yet another example, the plurality of teeth may each have a different profile to indicate a direction of rotation (e.g., the plurality of teeth may have a pattern of three different profiles, and analyzing adjacent strain profiles (e.g., adjacent in time) may indicate the direction of rotation).

Additionally, the magnet sheet 116 can be coupled to the strain sensor 118 such that the strain sensor 118 can detect when the magnet sheet 116 deforms based on attraction to a tooth of the plurality of teeth 111, via a strain applied by the deformation. Suitable examples of the strain sensor 118 include, but are not limited to, a planar sheet of a material whose resistance changes when a strain or pressure is applied, e.g., a foil strain gauge, a strain-sensitive resistor, a piezoelectric material, a strain gauge, or any other material or device that is able to measure stress, strain, or force applied to, and/or deformation of, the magnet sheet 116. For example, the magnet sheet 116 and the strain sensor 118 may be coupled to one another such that deformation of the magnet sheet 116 causes deformation of the strain sensor 118, which the strain sensor 118 can detect and convert into a corresponding electrical signal. In one implementation, the magnet sheet 116 and strain sensor 118 can be laminated into a single laminated object. As shown, in one implementation, the magnet sheet 116 can be positioned to face the wheel 104 with the strain sensor 118 on the opposing side of the magnet sheet 116; in another configuration, however, the strain sensor 118 can positioned on the side of the magnet sheet 116 so that the strain sensor 118 faces the wheel 104. Moreover, one or more apertures, such as aperture 120 between the magnet sheet 116 and/or the strain sensor 118 and the end of the one or more magnets 114, or such as aperture 120 between the magnet sheet 116 and/or the strain sensor 118 and the wheel 104, may be defined by the configuration of the components to allow sufficient space for the deforming movement of the magnet sheet 116.

In any case, the strain sensor 118 can detect deformation of the magnet sheet 116 as a strain applied to the strain sensor 118. The strain sensor 118 can detect a magnitude of the strain, and can output the strain to a processor for further processing. For example, strain that achieves a threshold can be interpreted as movement of the wheel 104 from a first rotational position (e.g., where a first longitudinal axis of tooth 130 is substantially in the plane in a highest strength portion of the magnetic field aligned along line 117) to a second position (e.g., where a first longitudinal axis of tooth 132 is substantially in the plane in a highest strength portion of the magnetic field aligned along line 117). Additionally, there can essentially be a one-to-one mapping between: (1) a detent action caused by attraction of a tooth of the plurality of teeth 111 to the magnetic field generated by the one or more magnets 114, e.g., in alignment with line 117, when moving the wheel 104 from the first position to the second position; and (2) the deformation of the magnet sheet 116 having a strain sufficient to be interpreted as movement of the wheel 104 from the first position to the second position. In other words, the first position of the wheel 104 may correspond to a first portion of the wheel 104 (e.g., a first tooth) being adjacent to the one or more magnets 114, e.g., aligned with line 117, and the second position may correspond to a second portion of the wheel 104 (e.g., an adjacent second tooth) being adjacent to the one or more magnets 114, e.g., aligned with line 117. Thus, in this case, the first and second positions are rotational positions of the wheel 104 corresponding to an angular position of a longitudinal axis of adjacent teeth of the plurality of teeth 111.

In other examples, interpretation of movement of the wheel 104 from the first position to the second position may correspond to detecting a combination of strains (or forces) via the strain sensor 118 (e.g., a strain achieving a first threshold followed by a strain achieving a second threshold, etc.). In any case, a processor (not shown) can interpret strain measurements from the strain sensor 118 to determine movement of the wheel 104 among a plurality of positions. For example, the processor may then provide one or more signals, such as but not limited to a pulse train, indicative of the movement, velocity, direction, and/or position of the wheel 104, to a computing device via a wired or wireless interface.

Additionally, the strain sensor 118 can be housed within the housing 106 and connected to one or more wires 121, 123 for providing strain measurements or related signals from the strain sensor 118.

Thus, the input device 100 may be configured such that the one or more magnets 114 generate a magnetic field that biases a respective tooth to the plurality of teeth 111 of the wheel 104 to be aligned along line 117. Further, while in this aligned position, the corresponding attraction between the magnet sheet 116 and the respective tooth causes deformation of the magnet sheet 116, which may be detected by the strain sensor 118. Therefore, as the wheel 104 rotates, the strain sensor 118 can output an electrical signal corresponding to the deformation of the magnet sheet 116 caused by the corresponding strain on the strain sensor 118, which indicates the movement, velocity, direction, and/or position of the wheel 104. In some implementations, this configuration of the input device 100 may provide a touchless, inexpensive, efficient, and accurate encoding device.

Referring to FIG. 3, an example of a perspective view of a mouse 300 that can employ input device 100 is illustrated. For example, mouse 300 can comprise a mouse that can employ the wheel 104, housing 106, etc., of input device 100 to receive an input from a user of the mouse 300, e.g., to control scrolling through a document or other item graphically presented on a display of a computing device in communication with the mouse. For example, mouse 300 can include a wire 302, which can be connected to an interface for communicating with a computing device (e.g., via a processor, not shown) to provide signals related to the signals received from the strain sensor 118, which may indicate movement, velocity, direction, and/or position of the wheel 104 in the mouse 300. In an example, other configurations of the input device 100 can be envisioned, such as positioned within a housing of a computing device (e.g., for providing a scrolling feature, audio volume adjustment, or substantially any programmable input), which may include a personal computing device, a computing device in an automobile, etc., positioned on a joystick or gamepad, positioned on an electronic pen, positioned on a home appliance or other Internet of Things (IoT) device, etc.

Referring to FIG. 4, an example of a schematic view of a computing environment 400 is illustrated. Computing environment 400 can include a computing device 402, such as a personal computer, a tablet computer, hybrid computer (e.g., a tablet computer with a detachable keyboard), etc. In this example, computing device 402 can include a processor 404 for executing instructions corresponding to an operating system, one or more applications executing on the operating system, etc. Computing device 402 can also include an interface component 406 for communicating with other devices, such as an input device 410. Computing device 402 may also optionally include or be connected to a display 408, such as a liquid crystal display (LCD), plasma display, etc., configured to display output from the computing device 402.

Computing environment 400 can also include an input device 410 for providing input to the computing device 402. For example, input device 410 may include input device 100 for providing input corresponding to movement of the wheel 104. Input device 410 may include a processor 412 for receiving signals from the strain sensor 118 and providing corresponding signals to computing device 402 via interface component 414. In a specific example, interface components 406, 414 can include substantially any wired or wireless interface components (e.g., universal serial bus (USB), firewire, etc., ports, Bluetooth, wireless local area network (WLAN), near field communication (NFC), etc. transceivers, and/or the like) that facilitate communicating signals between input device 410 and computing device 402. In an example, strain sensor 118 can provide strain measurements to processor 412, which may be caused by deformation of the magnet sheet 116 that is attached to the strain sensor 118, as described. Processor 412 may generate one or more signals for communicating to computing device 402 based on measurements from the strain sensor 118 (e.g., signals indicating detected strain that corresponds to movement, velocity, direction, and/or position of the wheel 104 of the input device 410).

Referring to FIG. 5, in conjunction with FIG. 4, an example of a method 500 for generating signals from an input device is illustrated. For example, method 500 can be performed by one or more input devices, as described herein, such as at least one of input devices 100, 410, mouse 300, etc.

In method 500, at action 502, a strain that achieves a threshold can be detected, where the strain is based on a magnet sheet deforming via magnetic attraction to a rotating wheel of an input device. For example, the strain sensor 118, e.g., in conjunction with processor 412, can detect the strain that achieves the threshold. As described and shown for input device 100, the strain sensor 118 may be coupled to the magnet sheet 116, and the wheel 104 can include the core 110 having the plurality of teeth 111 that can cause deformation of a suspended portion of the magnet sheet 116 based on magnetic attraction between the magnet sheet 116 and a tooth of the plurality of teeth 111. Thus, the magnet sheet 116 can deform towards and away from the wheel 104 (in direction 119) as the wheel 104 rotates. When processor 412 detects a strain that achieves a threshold strain (e.g., and/or one or more other strains that achieve one or more other thresholds), the processor 412 can determine that the wheel is moved from a first position to a second position. In addition, as described, based on the detected strain profile (e.g., a present strain and previous strain or otherwise strain over a period of time), the processor 412 may determine a direction in which the wheel rotated 104 respective to the magnet sheet 116.

In method 500, at action 504, an electronic signal can be generated based on the strain achieving the threshold. For example, processor 412 can generate the electronic signal based on the strain achieving the threshold. Processor 412 can generate the signal to be interpreted by the computing device 402 as a movement, velocity, direction, and/or position of the wheel of the input device 410, e.g., when moving from a first position to second position. For example, processor 412 may generate the signal to indicate whether the wheel is moved forward or backward respective to its positioning within an input device, such as a mouse, based on the profile of the detected strain (and/or previous strain), as described.

In method 500, at action 506, the electronic signal can be transmitted to a computing device using an interface between the computing device and the input device. For example, processor 412 can transmit, e.g., via interface component 414, the electronic signal to the computing device 402 using the interface between the computing device 402 and input device 410. In an example, processor 412 can transmit the electronic signal to the computing device 402 using a wired interface, such as USB, firewire, etc., a wireless interface, such as Bluetooth, WLAN, NFC, etc., and/or the like. In an example, the computing device 402 may interpret the signal as a command to provide a scrolling feature in an active application to navigate a document, web page, etc. For example, the scroll may be an up scroll or down scroll (or left or right scroll), etc., which can be determined based on the direction indicated by the strain profile.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. An input device, comprising:
   a housing;
   a wheel rotatably mounted to the housing, the wheel comprising a core having a plurality of teeth disposed on an outer edge of the core with a plurality of grooves between the plurality of teeth, wherein at least the plurality of teeth are composed of a ferrous or magnetic material;
   a magnet mounted within the housing to provide a first magnetic field that attracts the ferrous or magnetic material of the plurality of teeth to provide a detent action when moving the wheel from a first position to a second position;
   a magnet sheet mounted within the housing to provide a second magnetic field that causes at least a portion of the magnet sheet to deform based on magnetic attraction to the ferrous or magnetic material of the plurality of teeth when moving the wheel from the first position to the second position; and
   a strain sensor coupled to the magnet sheet and configured to:
      detect a strain caused by deformation of the magnet sheet; and
      provide an electronic signal indicating the strain.

2. The input device of claim 1, wherein the strain sensor is configured to provide the electronic signal based at least in part on detecting that the strain caused by deformation of the magnet sheet achieves a threshold strain.

3. The input device of claim 1, wherein the magnet sheet is fixed at one or more peripheral edges in the housing and has a suspend portion in a middle area.

4. The input device of claim 1, wherein the magnet includes a plurality of permanent magnets configured such that adjacent magnets of the plurality of permanent magnets have a similar pole facing the wheel such that a portion of the plurality of permanent magnets provide the first magnetic field that attracts the ferrous or magnetic material of the plurality of teeth when the wheel is moved from the first position to the second position.

5. The input device of claim 1, wherein the magnet includes a plurality of magnets configured in a Halbach array providing the first magnetic field on an end nearest the plurality of teeth on the wheel.

6. The input device of claim 1, wherein the first position corresponds to a first rotational position of the wheel where a first longitudinal axis of a first tooth of the plurality of teeth is aligned with a plane corresponding to a highest strength portion of the magnetic field of the magnet, and wherein the second position corresponds to a second rotational position of the wheel where a second longitudinal axis of a second tooth of the plurality of teeth is aligned with the plane corresponding to the highest strength portion of the magnetic field of the magnet, wherein the first tooth and the second tooth are adjacent teeth among the plurality of teeth.

7. The input device of claim 1, further comprising a processor that receives the electronic signal from the strain sensor and transmits a corresponding electronic signal to a computing device via an interface between the input device and the computing device.

8. The input device of claim 7, wherein the strain sensor transmits the corresponding electronic signal to the computing device based at least in part on determining that the strain indicated by the electronic signal achieves a threshold strain.

9. The input device of claim 7, wherein the computing device displays a scrolling action based on the electronic signal received from the input device.

10. The input device of claim 7, wherein the input device is situated in a mouse configured to transmit the corresponding electronic signals to the computing device.

11. The input device of claim 7, wherein the computing device controls an audio volume based on the electronic signal received from the input device.

12. The input device of claim 1, wherein the magnet sheet is disposed within the housing in a plane tangentially spaced apart from the wheel.

13. The input device of claim 1, wherein the strain sensor is coupled with the magnet sheet to define a laminated object.

14. The input device of claim 1, wherein the plurality of teeth have an asymmetric profile.

15. The input device of claim 1, wherein the strain sensor is configured to provide the electronic signal to indicate a direction of the wheel in moving from the first position to the second position based at least in part on a profile of the strain.

16. A method for generating signals at an input device, comprising:

detecting, via a strain sensor, a strain that achieves a threshold, wherein the strain is based on a magnet sheet deforming via magnetic attraction to one or more of a plurality of teeth of a core of a wheel moving from a first position to a second position, wherein the plurality of teeth are composed of a ferrous or magnetic material;

generating, via a processor, an electronic signal based on the strain achieving the threshold; and transmitting, via the processor, the electronic signal to a computing device using an interface between the computing device and the input device.

17. The method of claim 16, wherein the first position corresponds to a first tooth of the plurality of teeth in magnetic attraction with a magnet positioned adjacent to the magnet sheet, wherein the magnet sheet provides a first magnetic field and the magnet provides a second magnetic field, and wherein the second position corresponds to a second tooth of the plurality of teeth in magnetic attraction with the magnet, wherein the first tooth and the second tooth are adjacent teeth among the plurality of teeth.

18. The method of claim 16, wherein at least a portion of the magnet sheet deforms perpendicularly to a tangent of the wheel when attracted to the one or more of the plurality of teeth.

19. The method of claim 16, wherein at least a portion of the magnet sheet deforms within an aperture defined in a housing that rotatably holds the wheel, and wherein the magnet sheet is situated in a plane tangentially spaced apart from the wheel.

20. The method of claim 19, wherein the magnet sheet and the strain sensor are coupled together to define a laminated object.

* * * * *